United States Patent [19]

Jaw

[11] Patent Number: 5,119,842
[45] Date of Patent: Jun. 9, 1992

[54] NOZZLE FOR INFLATABLE OBJECTS

[76] Inventor: Horng-Chang Jaw, 6 Fl., No. 21, Alley 29, Lane 372, Sec. 5, Chung Siao E. Rd., Taipei, Taiwan

[21] Appl. No.: 734,448

[22] Filed: Jul. 23, 1991

[51] Int. Cl.⁵ .................. F16K 15/18; F16K 15/20
[52] U.S. Cl. ................................. 137/232; 137/523; 137/855; 446/222; 446/224
[58] Field of Search ............... 137/223, 232, 522, 523, 137/848, 855; 446/222, 224

[56] References Cited

U.S. PATENT DOCUMENTS

| | | | |
|---|---|---|---|
| 2,700,980 | 2/1955 | Andrews | 137/848 X |
| 2,839,073 | 6/1958 | Marsh | 137/232 |
| 2,841,166 | 7/1958 | Auzin | 137/848 X |
| 2,977,973 | 4/1961 | Chakine | 446/222 X |
| 4,004,614 | 1/1977 | Mackal et al. | 446/222 X |
| 4,823,831 | 4/1989 | Jaw | 137/855 X |
| 4,924,899 | 5/1990 | Po | 137/232 |

FOREIGN PATENT DOCUMENTS 797059 6/1958 United Kingdom ............... 137/232

*Primary Examiner*—John Rivell
*Attorney, Agent, or Firm*—Bacon & Thomas

[57] ABSTRACT

An improved nozzle for inflatable objects including a nozzle seat, a first annular wall extending from which, a relatively thin ring portion on the first annular wall to serve as a bending position, a conical body defining an air inlet located on the ring portion, an one-way membrane beneath the air inlet, a tab and a plug arm carrying a plug and having a protuberance at an end for inserting to the air inlet to push away the one-way membrane for deflation purpose.

2 Claims, 5 Drawing Sheets

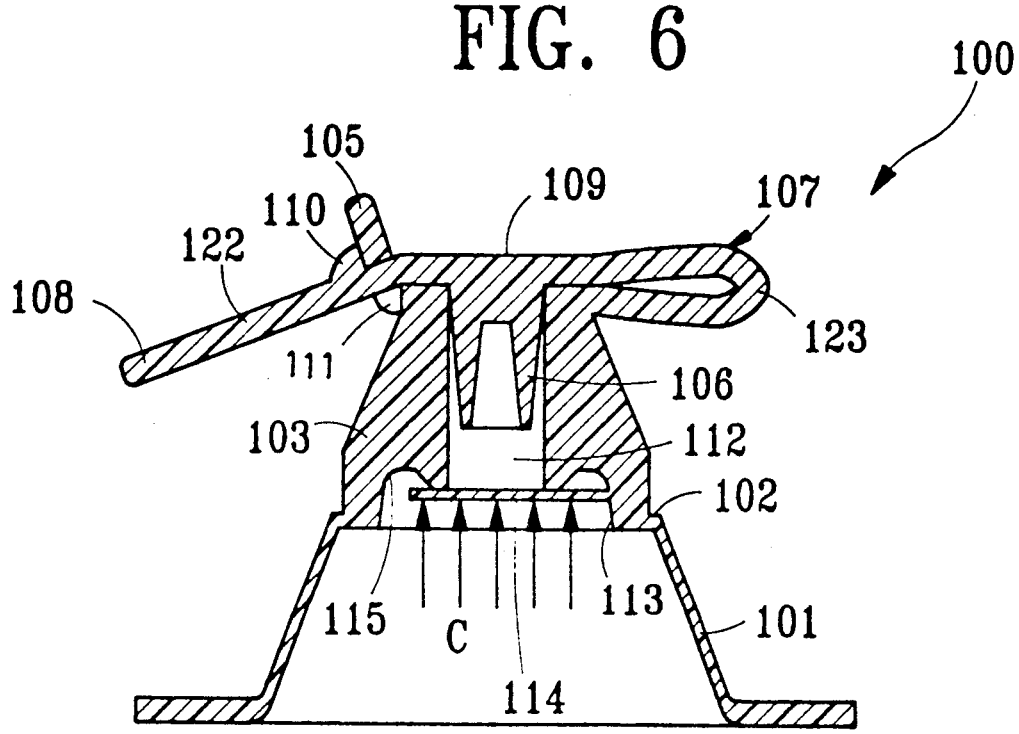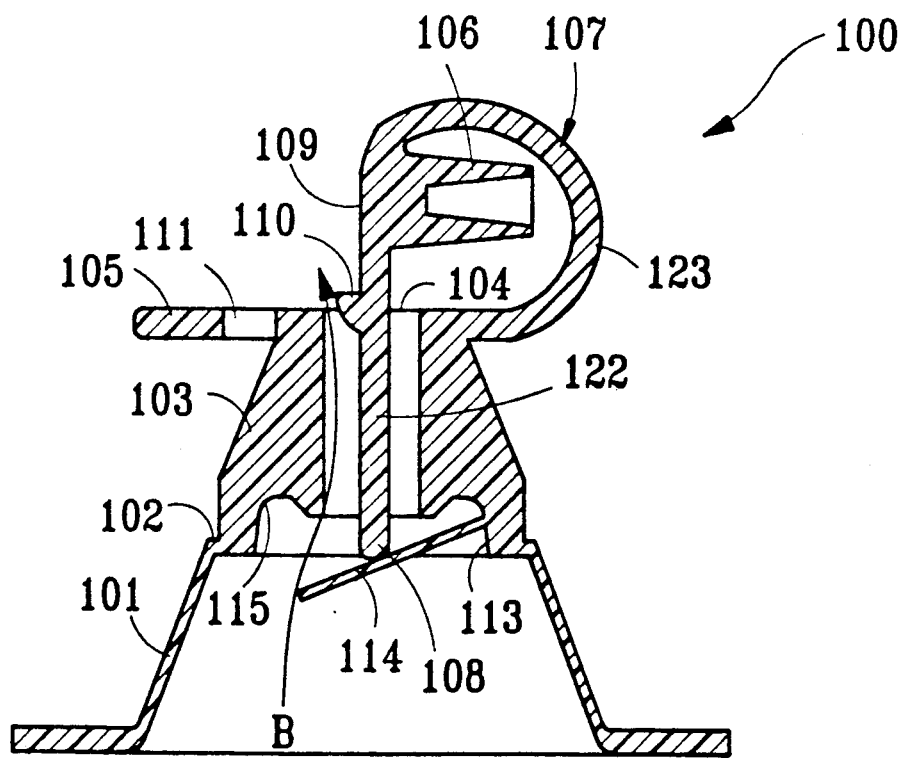

NOZZLE FOR INFLATABLE OBJECTS

BACKGROUND OF THE INVENTION

The present invention relates to a nozzle and more particularly to a nozzle for inflatable objects.

For inflation with a conventional nozzle, such as that shown in FIG. 1, it is necessary to grip the nozzle seat (41) of the nozzle (4) firmly with one hand in order to squeeze the air inlet (42) and then open a seam (43) to form an air passage, while the other hand is operating a pump, or while the nozzle is blown manually. The inflation is indeed very inconvenient. Similarly, it is necessary to squeeze the air inlet (42) to open the seam (43), or to insert a long stick into the air inlet to keep the seam (43) opening for deflation. Prolonged opening of the seam (43) will result in elastic fatigue, and consequently the nozzle will become out of order.

When another kind of conventional nozzle, a nozzle (5) with a long tail (51) as shown in FIG. 2 is used, the inflation process which is exactly like that with the nozzle shown in FIG. 1, is very inconvenient. For deflation, the long tail (51) is inserted into the air inlet (52) to keep the seam (53) opening. Such kind of nozzle has the following defects: (a) because inflatable objects are mostly made of soft PVC, the strength of the long tail (51) is not sufficient to keep the seam (53) opening for the seam (53) itself is a cutting at the cylindrical body of the air inlet (52) and the cutting is usually very small; (b) the long tail (51) does not have aid to keep retaining in the seam (53), air pressure may blow it away, and it is then necessary to insert another long stick to keep the seam (53) opening; (c) a considerable length of the long tail (51) is needed to open the seam (53), but the longer the long tail (51), the smaller its strength, simply because it is made of soft PVC; and (d) prolonged opening of the seal (53) will result in elastic fatigue, and consequently the tightly closing of the nozzle can't be resumed.

The U.S. Pat. No. 4,823,831 discloses a nozzle for inflatable objects, including a nozzle seat (10), an annular wall (11) extended on the top of the nozzle seat (10) to define an air inlet (12), a plug (20) for insertion into the air inlet (12), a plug arm (21) connecting to the plug (20), and an one-way membrane (40) beneath the air inlet (12). It is characterized by the design of a plug extension (22) with two holes (23) extended from the plug (20) at a position remote from the plug arm (21) for engagement with a tie (30), and the design of the one-way membrane (40) extended from the inner wall of the nozzle seat (10) to seal the air inlet (12). The tie (30) has a knob (31) at its end to help positioning of the plug (20) in place, and has a serrated lower surface (32) to prevent the tie (30) from slipping back after passing through the holes (23). The one-way membrane (40) beneath the air inlet (12) serves as a check valve during inflation, and can be pushed away to open the air inlet (12) for deflation simply by retracting the nozzle. Though the nozzle can provide satisfactory safety to inflatable objects such as swimming ring and air boat, retraction of the nozzle may detach the one-way membrane from the sealing position, and then accidental shock to the inflatable object may remove the plug (20) from the air inlet (12) and result in unwanted deflation.

SUMMARY OF THE INVENTION

The invention provides an improved nozzle for inflatable objects including a nozzle seat, a first annular wall extending from which, a relatively thin ring portion on the first annular wall to serve as a bending position, a conical body defining an air inlet located on the ring portion, an one-way membrane beneath the air inlet, a tab and a plug arm carrying a plug and having a protuberance at an end for inserting into the air inlet passage to push away the one-way membrane for deflation purpose.

The nozzle according to the present invention has the following merits: (a) easy to use; (b) the one-way membrane can keep sealing the air inlet tightly after the nozzle is retracted—a design to provide additional safety even if the plug is removed accidentally; (c) insertion of the plug arm can push away the one-way membrane easily and keep the air inlet opening for deflation without using of any long stick; (d) the one-way membrane is very thin, and hence it can be pushed away to open the air inlet easily by insertion of the plug arm; and (e) design of two spokes at the plug arm's protuberance can retain the plug arm in place firmly during deflation.

Therefore, the main objective of the present invention is to provide a nozzle with an one-way membrane to seal the air inlet tightly even after the nozzle has been retracted to remain flush with the surface of inflatable object.

Another objective of the present invention is to provide a nozzle which permits deflation simply by inserting a plug arm in the air inlet to push away the one-way membrane and the plug arm is kept thereon by a protuberance to maintain deflation without using of any long stick.

Another objective of the present invention is to provide a nozzle with a plug arm for deflation by inserting the lug arm into the air inlet to push away the one-way membrane and kept its protuberance in place by two spokes which extend against the air inlet so that the plug arm will not be blown away by air pressure from deflation.

The present invention can be best understood through the following description and accompanying drawings.

BRIEF DESCRIPTION OF THE DRAWINGS

FIG. 6 is a sectional view of the nozzle for inflatable objects according to the present invention at sealing state.

FIG. 7 is a sectional view of the nozzle for inflatable objects according to the present invention at deflation state.

DETAILED DESCRIPTION OF THE PREFERRED EMBODIMENT

Figure 3:
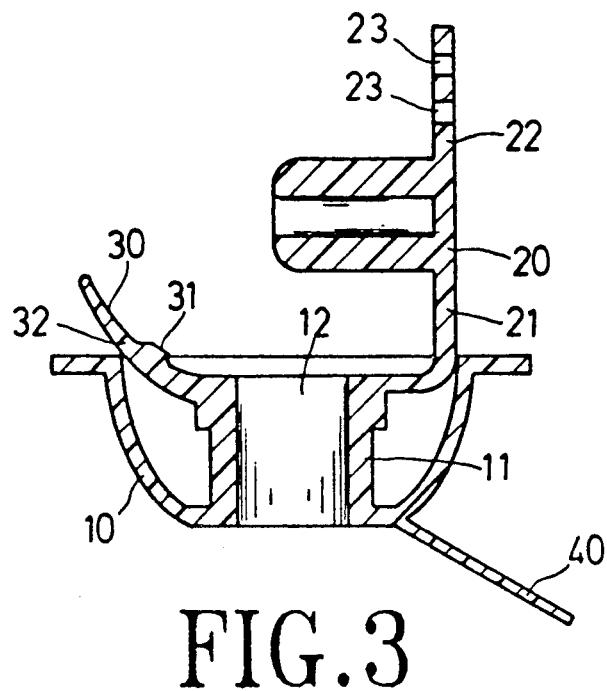
FIG. 3 is a sectional view of a nozzle with one-way membrane for inflatable objects.
Figure 2:
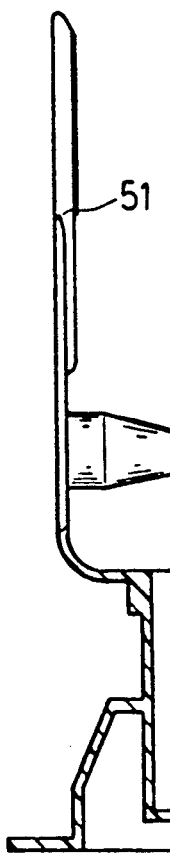
FIG. 2 is a sectional view of a conventional nozzle with long tail.
Figure 1:
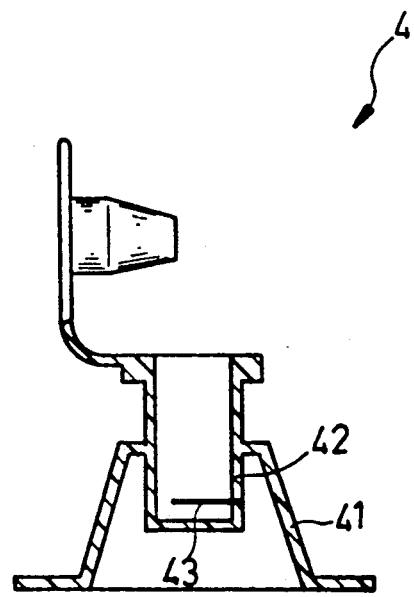
FIG. 1 is a sectional view of a conventional nozzle.
Figure 4:
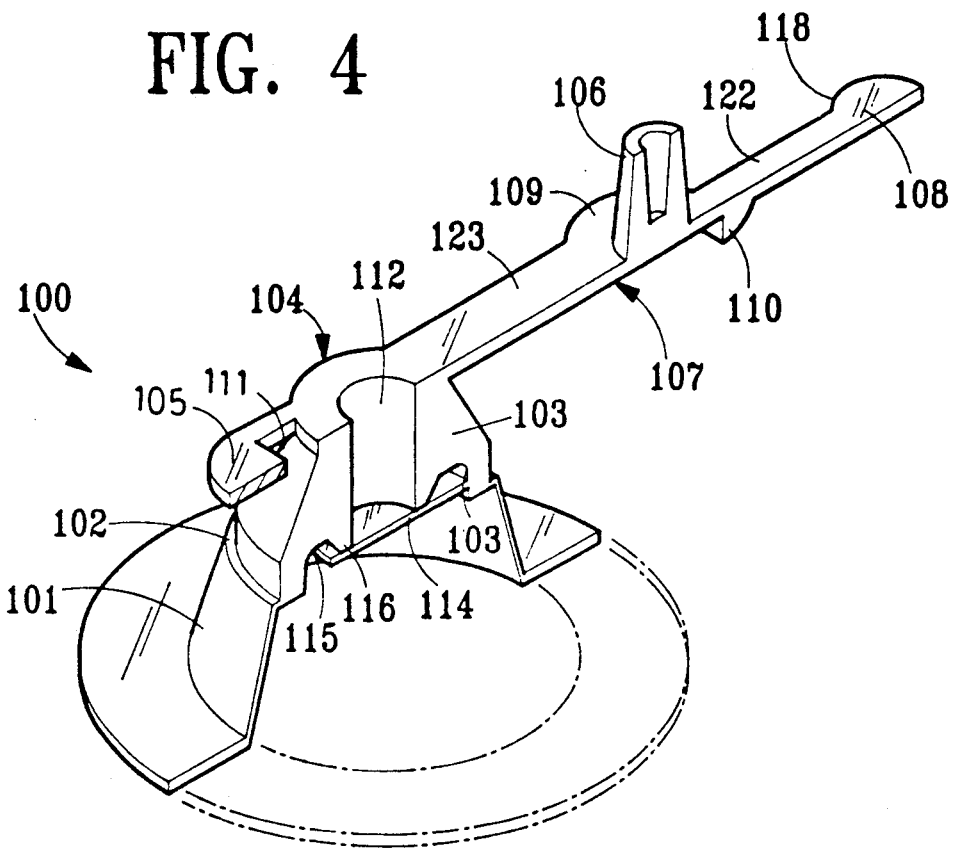
FIG. 4 is a cutaway perspective view of a nozzle for inflatable objects according to the present invention.
Figure 11:
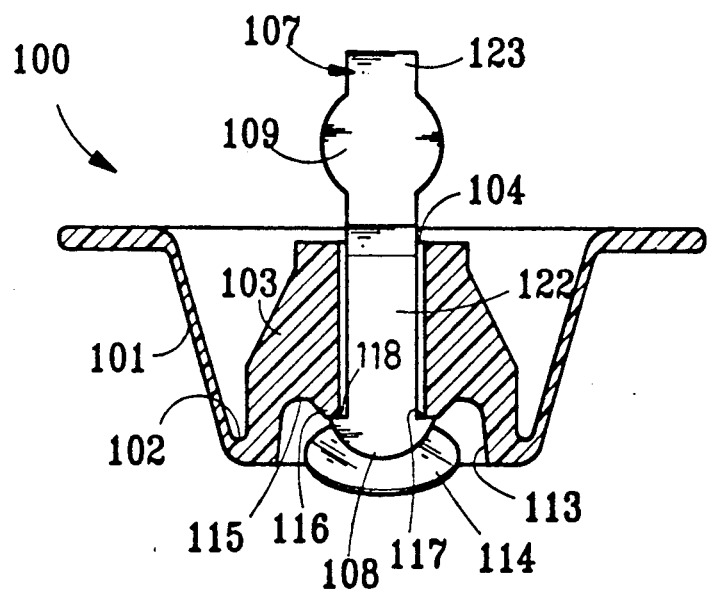
FIG. 11 is a sectional view of the nozzle for inflatable objects according to the present invention after the nozzle has been rotated for 90 degree.

Please refer to FIG. 4, a cutaway sectional view of a nozzle for inflatable objects according to the present invention, the nozzle (100) includes a nozzle seat (119), a first annular wall (101) extending from the nozzle seat (119), a relatively thin ring portion (102) formed on the top of the first annular wall (101), and a relatively thick conical body (103) on the ring portion (102). The conical body (103) is composed of a second annular wall (120) and a conical wall (121). The ring portion (102) between the first annular wall (101) and the second annular wall (120) serves as a bending portion for retraction of the nozzle (100) into the inflatable object. Bending occurs at the ring portion (102) because the ring portion (102) and the first annular wall (101) are relatively thin, and the second annular wall (120) is relatively thick. A tab (105) and a plug (106) are formed at respective appropriate positions extending from the top edge (104) of the conical body (103). The plug (106) is designed on a plug arm (107) having an end connecting to the top edge (104) of the conical body (103). The other end of the plug arm (107) is designed with a protuberance (108) having two spokes (117 and 118), as shown in FIG. 11. On the surface (109) approximately opposite to the plug (106) the plug arm (107) is designed with a projection (110). The plug arm (107) is separated by the plug (106) into two parts—the first plug arm portion (122) and the second plug arm portion (123). The length of the plug arm (122) is slightly greater then length of an air inlet (112). The length of the plug arm (123) is slightly greater than the length required for surrounding the plug (106). The tab (105) is designed with a hole (111) for engagement with the projection (110) on the plug arm (107).

The air inlet (112) is defined in the middle of the conical body (103) and extends from the conical wall (121) to the second annular wall (120) to become an exposed annular body (116). The annular body (116) and the second annular wall (120) define an annular groove (115).

An one-way membrane (114) is designed at the inner wall of the second annular wall (120) at a location just beneath the air inlet (112) to permit air to flow through the air inlet (112). When the first annular wall (101) has been pressed to bend at the ring portion (102), the one-way membrane (114) seals the air inlet (112) tightly to prevent air from flowing out of the inflatable object. When the plug arm (122) has been inserted into the air inlet (112) until the protuberance (108) has pushed away the one-way membrane, the two spokes (117 and 118) can retain the protuberance (108) on the annular body (116) in spite of impact from the out-flowing air. It is a design to ease deflation of inflatable objects.

Figure 5:
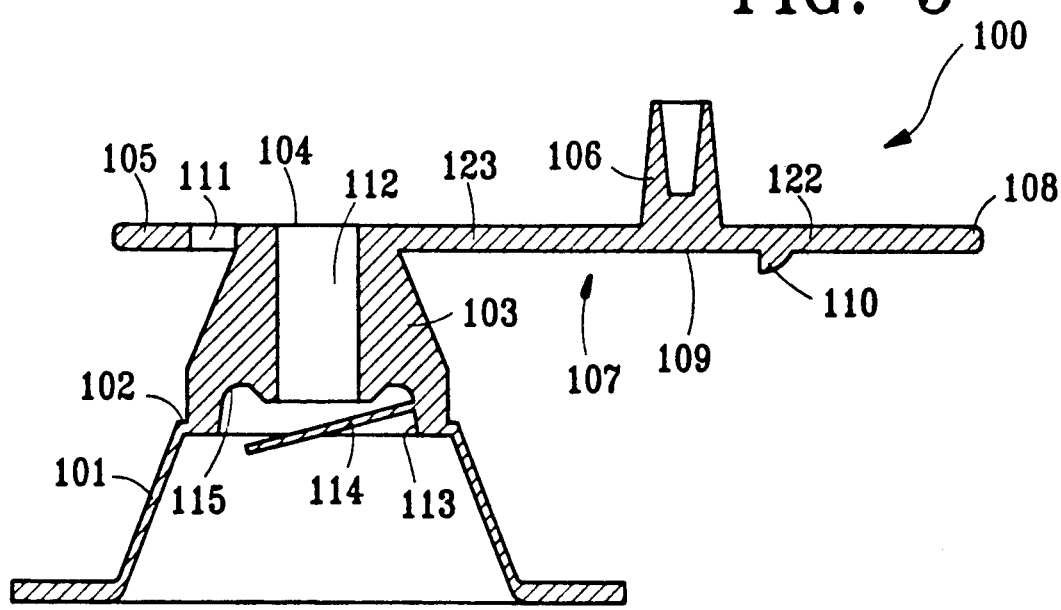
FIG. 5 is a sectional view of the nozzle for inflatable objects according to the present invention at inflation state.

Please refer to FIGS. 5, 6 and 7 which illustrate the nozzle for inflatable objects at different conditions. Upon inflation of the inflatable object by means of a pump or other method, the air pressure A applied to it forces the one-way membrane away from the air inlet (112) for inflation purpose. As shown in FIG. 6, after inflation of the inflatable object, the air pressure C forces the one-way membrane (114) to seal the air inlet (112) tightly to prevent air from flowing out. The plug (106) can be then inserted into the air inlet (112), the plug arm (107) is inserted through the hole (111) of the tab (105) and to connect to the tab (105) by engaging the projection (110) on the plug arm (107) with the tab (105).

As shown in FIG. 7, for deflation of the inflatable object, the plug arm (107) is disengaged with the tab (105), the plug (106) is removed from the air inlet (112), the plug arm (107) is inserted into the air inlet (112) to push away the one-way membrane (114) with the protuberance (108) for out-flowing of air through the air inlet (112). At such condition, the protuberance (108) is retained by two spokes (117 and 118) which are extending against the annular body (116) so the air pressure B can not displace it. After the inflatable object has been entirely deflated, a slight force can remove the plug arm (107) from the air inlet (112).

Figure 8:
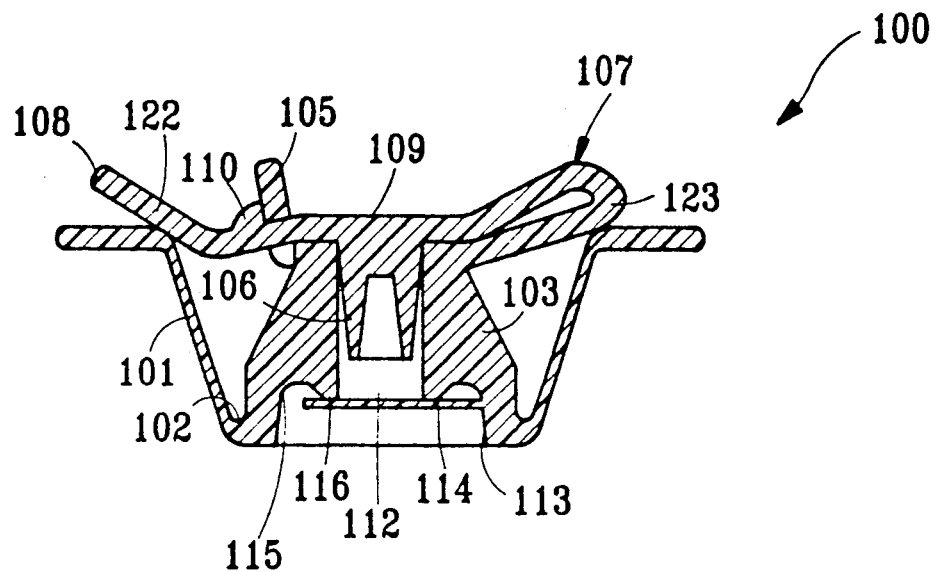
FIG. 8 is a sectional view of the nozzle for inflatable objects according to the present invention at closing condition after the nozzle has been retracted.

Please refer to FIGS. 8, a sectional view illustrating the nozzle for inflatable objects which has been retracted, after inflation of the inflatable object, with the ring portion (102) in a bent position, the nozzle (100) is retracted and maintained flush with the surface of the inflatable object. The retraction of the nozzle (100) will not move the one-way membrane, the plug (106) can be inserted into the air inlet (112), and the plug arm (107) can be led to pass through the hole (111) of the tab (105) and to connect to the tab (105) by engaging the projection (110) on the plug arm (107) with the tab (105).

Figure 9:
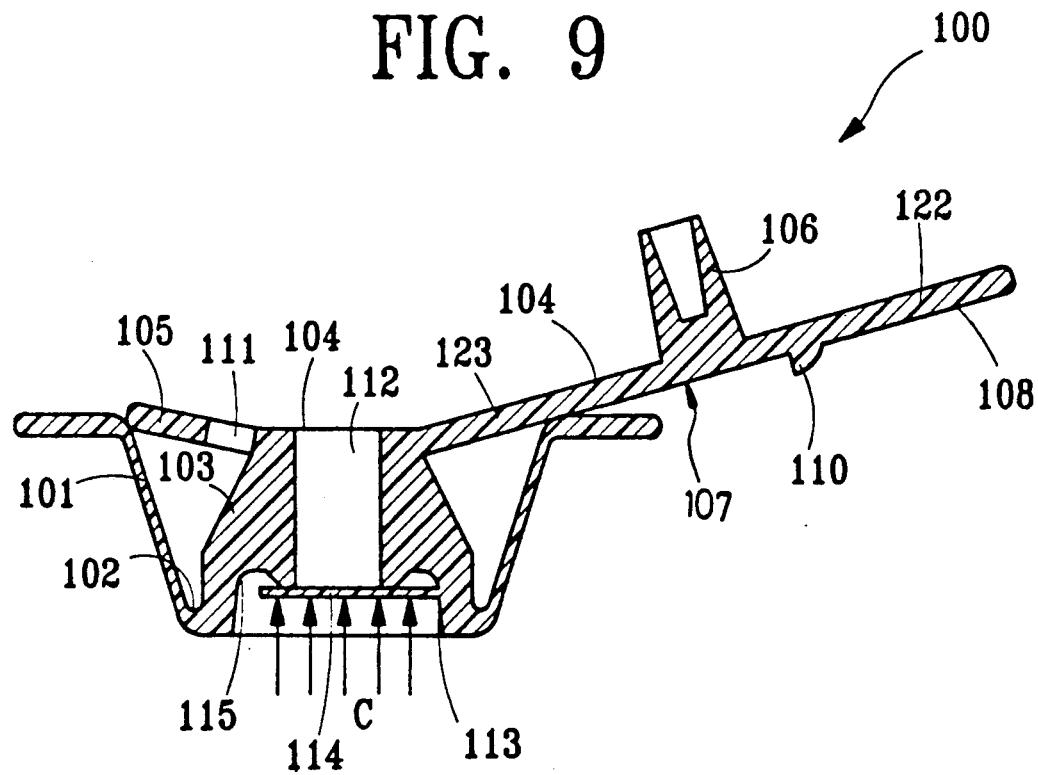
FIG. 9 is a sectional view of the nozzle for inflatable objects according to the present invention after the nozzle has been retracted but the air inlet is not sealed by the plug.

As shown in FIG. 9, a sectional view illustrating the nozzle for inflatable objects before fixing of the plug, though the projection (110), which is made of soft PVC, may be disengaged by impact of external force, the one-way membrane keeps on sealing the air inlet (112) to prevent from out-flowing of air. Hence, the present invention provides a double-sealing effect to inflatable objects.

Figure 10:
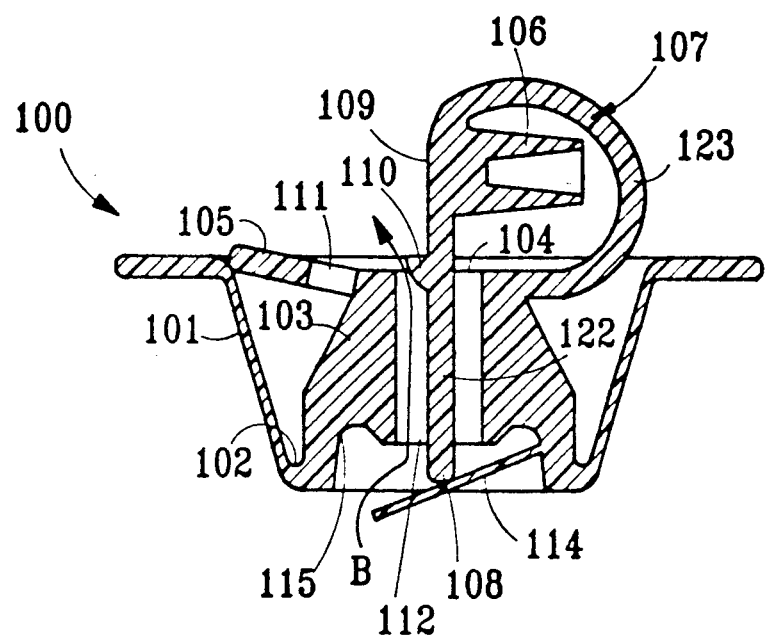
FIG. 10 is a sectional view of the nozzle for inflatable objects according to the present invention showing the one-way membrane is pushed away by the plug arm's protuberance when the nozzle has been retracted.

As shown in FIGS. 10 and 11, for deflation purpose the plug arm (107) is inserted into the air inlet (112) to push away the one-way membrane with the protuberance (108) for out-flowing of air through the air inlet (112). At such condition, the protuberance (108) is retained by two spokes (117 and 118) which engage against the annular body (116) so the air pressure B can not displace it. After the inflatable object has been entirely deflated, a slight force can remove the plug arm (107) from the air inlet (112).

As described above, the one-way membrane (114) keeps on sealing the air inlet (112) after the nozzle (110) is retracted. Without aid of any article, the inflatable object can be deflated simply by inserting the plug arm (107) into the air inlet (112) till the protuberance (108) pushes away the one-way membrane (114). Therefore, the present invention provides a safe nozzle for all inflatable objects.

As indicated, the structure herein may be variously embodied. Recognizing various modifications will be apparent, the scope hereof shall be deemed to be defined by the claims as set forth below.

What is claimed is:

1. A nozzle for inflatable objects comprising:
a) a seat for attachment to an inflatable object, the seat including an upwardly extending first annular wall and a ring portion on the top of the first annular wall;

b) a conical body extending upwardly from the ring portion, the conical body including a second annular wall extending upwardly from the ring portion, a conical wall extending upwardly from the second annular wall and a central air inlet passage, the ring portion defining a bending junction between the first and second annular walls;

c) a plug arm extending from a top edge of the conical body and including an outer end terminating in a protuberance having two spokes, a plug carried by the plug arm for insertion into the air inlet passage, the plug being positioned intermediate the protuberance and the conical body to define a first plug arm section between the plug and the protuberance and a second plug arm section between the plug and the conical body, wherein the length of the first plug arm section is greater than the length of the second plug arm section; and d) a one-way membrane positioned at an inner wall of the second annular wall for sealing the air inlet passage, and to permit air to pass through the air inlet passage when the first plug arm section is inserted through the air inlet passage and the two spokes of the protuberance are engaged with an inner edge of the air inlet passage.

2. The nozzle of claim 1 wherein:

a) the plug arm includes a projection extending outwardly therefrom;

b) a tab extending outwardly from the top of the conical body, the tab including a hole formed therethrough; and c) the first plug arm section being insertable through the hole of the tab and the projection being engageable against the tab when the plug is inserted within the air inlet passage.

* * * * *